US009071976B2

(12) United States Patent
Mueck

(10) Patent No.: US 9,071,976 B2
(45) Date of Patent: Jun. 30, 2015

(54) COMMUNICATION NETWORK DEVICE, COMMUNICATION DEVICE, METHOD FOR MANAGING COMMUNICATION RESOURCE ALLOCATION AND METHOD FOR COMMUNICATION RESOURCE ALLOCATION

(75) Inventor: Markus Dominik Mueck, Unterhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 301 days.

(21) Appl. No.: 13/484,350

(22) Filed: May 31, 2012

(65) Prior Publication Data

US 2013/0324174 A1 Dec. 5, 2013

(51) Int. Cl.
*H04W 72/00* (2009.01)
*H04B 7/00* (2006.01)
*H04W 16/14* (2009.01)
*H04W 72/06* (2009.01)
*H04W 16/10* (2009.01)
*H04W 36/16* (2009.01)

(52) U.S. Cl.
CPC .............. *H04W 16/14* (2013.01); *H04W 72/06* (2013.01); *H04W 16/10* (2013.01); *H04W 36/16* (2013.01)

(58) Field of Classification Search
CPC ..... H04W 16/06; H04W 16/10; H04W 16/14; H04W 72/04; H04W 72/06
USPC ........ 455/450–452.1, 509–510; 370/328–330
See application file for complete search history.

(56) References Cited

U.S. PATENT DOCUMENTS

| 8,233,928 | B2 * | 7/2012 | Stanforth et al. ............. 455/509 |
| 8,504,087 | B2 * | 8/2013 | Stanforth et al. ............. 455/512 |
| 8,830,947 | B2 * | 9/2014 | Turtinen et al. ............... 370/330 |
| 2011/0077042 | A1 | 3/2011 | Stanforth et al. |
| 2011/0080882 | A1 * | 4/2011 | Shu et al. ...................... 370/329 |
| 2011/0096770 | A1 * | 4/2011 | Henry ............................ 370/352 |
| 2011/0195667 | A1 * | 8/2011 | Hassan et al. ................... 455/62 |
| 2012/0009874 | A1 * | 1/2012 | Kiukkonen et al. ......... 455/41.2 |
| 2012/0033621 | A1 | 2/2012 | Mueck et al. |
| 2012/0052891 | A1 * | 3/2012 | Irnich et al. ................... 455/501 |
| 2012/0063383 | A1 * | 3/2012 | Barbieri et al. ............... 370/315 |
| 2012/0115525 | A1 * | 5/2012 | Kang et al. .................... 455/509 |
| 2012/0122477 | A1 | 5/2012 | Sadek et al. |
| 2012/0182887 | A1 * | 7/2012 | Junell et al. ................... 370/252 |
| 2012/0195270 | A1 * | 8/2012 | Kang et al. .................... 370/329 |

(Continued)

OTHER PUBLICATIONS

Standardization Mandate to CEN, CENELEC and ETSI for a Software Defined Radio architechture and for certain aspects of Cognitive Radio; European Commission, Dec. 2011, pp. 1-12.

(Continued)

*Primary Examiner* — Simon Nguyen
(74) *Attorney, Agent, or Firm* — Schwabe, Williamson & Wyatt, P.C.

(57) ABSTRACT

According to an aspect of this disclosure, a communication network device is provided comprising a receiver configured to receive a request that communication resources, that have been free for allocation by a communication network should not be allocated by the communication network; a determiner configured to determine a set of communication devices for which the communication resources have been free for allocation and which should not allocate the communication resources; and a controller configured to cause that the communication resources are not allocated by the communication devices of the determined set.

20 Claims, 11 Drawing Sheets

(56) References Cited

U.S. PATENT DOCUMENTS

| | | | | |
|---|---|---|---|---|
| 2012/0281594 A1* | 11/2012 | Stewart et al. | | 370/259 |
| 2012/0282942 A1* | 11/2012 | Uusitalo et al. | | 455/452.2 |
| 2013/0016221 A1* | 1/2013 | Charbit et al. | | 348/180 |
| 2013/0235810 A1* | 9/2013 | Kasslin et al. | | 370/329 |
| 2013/0279376 A1* | 10/2013 | Ahmadi | | 370/277 |

OTHER PUBLICATIONS

IETF PAWs, Data Model in Support of White Space Database Access Protocols; Taipei, Nov. 15, 2011; http://www.ietf.org/proceedings/82/slides/paws-5.pdf; pp. 1-9.

John Malyar et al.; PAWs WG IETF-82, Device to Database Protocol for White Space, Nov. 2011; http://www.ietf.org/proceedings/82/slides/paws-3.pdf; pp. 1-20.

Stanislav Filin et al.; Performance Evaluation of IEEE 802.19.1 Coexistence System; International Conference on Communications, 2011; pp. 1-6.

OFCOM UK, Implementing Geolocation, Summary of consultation responses and next steps; Sep. 1, 2011; http://stakeholders.ofcom.org.uk/binaries/consultations/geolocation/statement/statement.pdf; pp. 1-30.

German Patent Office; Office Action for German App. No. 102013105606.7 dated Dec. 16, 2014; 14 pages inclusive of English translation.

* cited by examiner

US 9,071,976 B2

COMMUNICATION NETWORK DEVICE, COMMUNICATION DEVICE, METHOD FOR MANAGING COMMUNICATION RESOURCE ALLOCATION AND METHOD FOR COMMUNICATION RESOURCE ALLOCATION

TECHNICAL FIELD

Aspects of this disclosure generally relate to communication network devices, communication devices, methods for managing communication resource allocation and methods for communication resource allocation.

BACKGROUND

With an increasing amount of data being transmitted by radio, radio resources, such as frequency bands or frequency regions, have become a scarce resource. So called white spaces allow the opportunistic usage of spectral resources that are licensed to other systems. Approaches that allow efficient usage of such white spaces are desirable.

SUMMARY

According to an aspect of this disclosure, a communication network device is provided including a receiver configured to receive a request that communication resources, that have been free for allocation by a communication network should not be allocated by the communication network; a determiner configured to determine a set of communication devices for which the communication resources have been free for allocation and which should not allocate the communication resources; and a controller configured to cause that the communication resources are not allocated by the communication devices of the determined set.

According to another aspect of this disclosure, a communication device is provided including a receiver configured to receive a first message indicating that communication resources are free for allocation by the communication device during a time period; a controller configured to allocate the communication resources for the time period; wherein the receiver is configured to receive a second message indicating that the communication resources should not be allocated by the communication device and wherein the controller is configured to de-allocate the communication resources for the time period.

According to other aspects of this disclosure, a method according to the communication network device and a method according to the communication device described above are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the aspects of this disclosure. In the following description, various aspects of this disclosure are described with reference to the following drawings, in which.

DESCRIPTION

Figure 1:
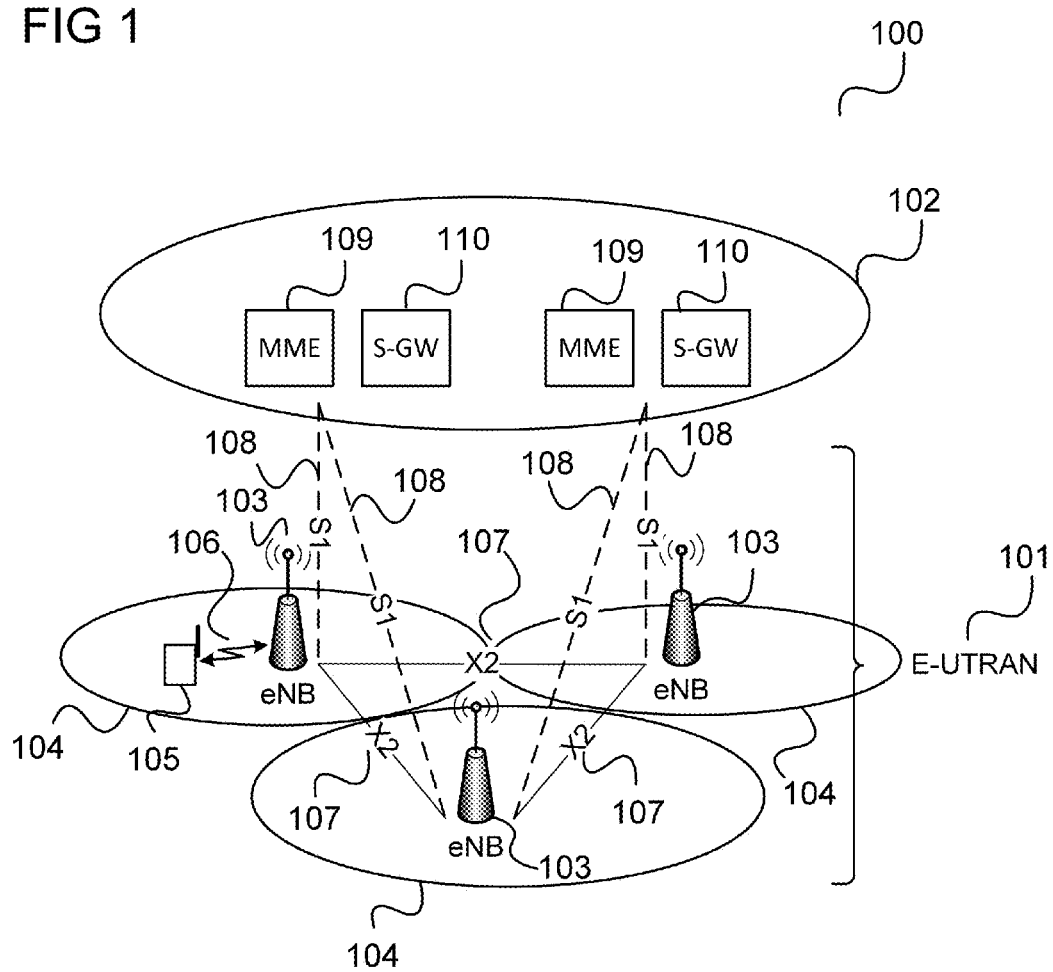
FIG. 1 shows a communication system according to an aspect of this disclosure.

The following detailed description refers to the accompanying drawings that show, by way of illustration, specific details and embodiments in which the various aspects of this disclosure may be practiced. These embodiments are described in sufficient detail to enable those skilled in the art to practice the aspects. Other embodiments may be utilized and structural, logical, and electrical changes may be made without departing from the scope of the aspects. The various embodiments are not necessarily mutually exclusive, as some embodiments can be combined with one or more other embodiments to form new embodiments.

The term "white spaces" is typically used in the context of the switching from analogue to digital TV (television). Since digital TV needs far less bandwidth due its increased spectral efficiency over the legacy analogue TV, large parts of the frequency band that is currently occupied by analogue TV can be reused by other systems. For this purpose, two approaches may be used:

Some parts of the spectrum may be entirely re-assigned to other systems. For example, the spectrum 790-862 MHz (in Europe) or 698-790 MHz (in the US) is typically auctioned by national regulators. This part of the spectrum is typically referred to as "Digital Dividend".

Some parts of the spectrum may be assigned to the newly introduced digital TV. Typically, this is the spectrum 470-790 MHz in Europe and between 54-698 MHz in the US (TV channels 2-51; however not all the spectrum between 54-698 MHz is available, there are some parts allocated to other systems, white spaces are only possible to used for those parts that are actually allocated to TV). It can be expected, however, that the digital TV coverage may be low in some geographical regions. Therefore, a "secondary user" of a "secondary system", i.e. a device of another communication system than the TV broadcasting network, may be allowed to access these frequency bands if the "primary system", i.e. the TV broadcaster, is not using it. These (temporally, geographically) unused parts of the spectrum are referred to by "white spaces".

The idea of introducing white spaces for allowing unlicensed users to operate in licensed bands may be applied to other frequency bands than frequency bands allocated to TV broadcast. For example, according to the IEEE 802.11y standard, similar ideas may be applied to satellite bands and the 2.3-2.4 GHz band is a major candidate for being opened to spectrum sharing.

According to one aspect of this disclosure, "white spaces" in cellular phone frequency bands, i.e. in frequency bands allocated to one or more cellular mobile communication systems, or, generally in frequency bands allocated to wireless bidirectional communication system, are used. This may provide a high amount of communication resources, since the geographic coverage of cellular phone access, i.e. of cellular mobile radio networks, such as UMTS (Universal Mobile Telecommunications System) communication networks, is still limited to key areas in the various countries. As long as an operator having licensed a part of the spectrum is not using this part of the spectrum, i.e. these frequency regions, in a certain geographical region, this part of the spectrum may be opened to other systems in this geographical region, e.g. for secondary spectrum usage, i.e. for usage of this part of the spectrum by other communication systems than the cellular communication network of this operator.

Various aspects of this disclosure are explained in the following with reference to an LTE (Long Term Evolution) cellular communication system as example for a wireless bidirectional communication system. A mobile terminal used according to aspects of this disclosure may also use other communication systems for communication (possibly using the white space spectrum, if it is available) such as WLAN (wireless local area network), WiFi, UMTS, GSM (Global System for Mobile Communications), Bluetooth etc.

FIG. 1 shows a communication system 100 according to an aspect of this disclosure.

According to this aspect of this disclosure, the communication system 100 is configured in accordance with the network architecture of LTE.

The communication system includes a radio access network (E-UTRAN, Evolved UMTS Terrestrial Radio Access Network) 101 and a core network (EPC, Evolved Packet Core) 102. The E-UTRAN 101 may include base (transceiver) stations (eNodeBs, eNBs) 103. Each base station 103 provides radio coverage for one or more mobile radio cells 104 of the E-UTRAN 101.

A mobile (communication) terminal (UE, user equipment) 105 located in a mobile radio cell 104 may communicate with the core network 102 and with other mobile terminals 105 via the base station providing coverage (in other words operating) the mobile radio cell.

Control and user data are transmitted between a base station 103 and a mobile terminal located in the mobile radio cell 104 operated by the base station 103 over the air interface 106 on the basis of a multiple access method.

The base stations 103 are interconnected with each other by means of the X2 interface 107. The base stations are also connected by means of the S1 interface 108 to the core network (Evolved Packet Core) 102, more specifically to a MME (Mobility Management Entity) 109 and a Serving Gateway (S-GW) 110. The MME 109 is responsible for controlling the mobility of UEs located in the coverage area of E-UTRAN, while the S-GW 110 is responsible for handling the transmission of user data between mobile terminals 105 and core network 102.

In the framework of cognitive radio (CR), the opportunistic usage of spectrum is an application of key focus. In particular, the TV Spectrum (Europe: 470 MHz-790 MHz) is expected to be locally/temporally underused and thus it can be used by a secondary user (SU), such as the mobile terminal 105, e.g. for communicating with a base station 103, while the primary user (PU), in this case the TV broadcaster, is absent, i.e. is not using these white space frequencies. Depending on the location of the mobile terminal 105, a sub-set of the entire TV Spectrum may be available for secondary usage. This is illustrated in FIG. 2.

Figure 2:
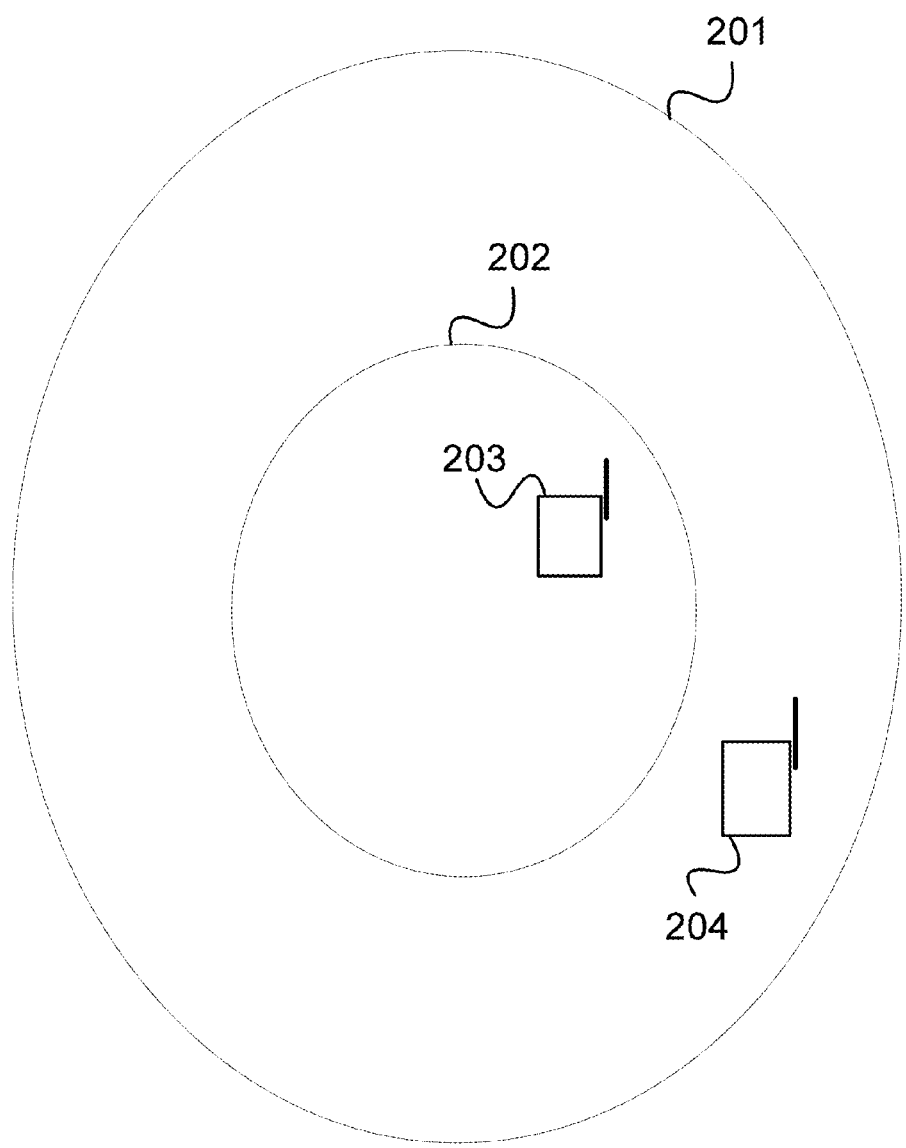
FIG. 2 shows an example for available white band frequencies depending on the location.

FIG. 2 shows an example for available white band frequencies depending on the location.

In this example, it is assumed that in a first geographical region 201 (in this example ellipse-shaped) a white space sub-spectrum S1 of an overall white space spectrum (e.g. a TV white space (TVWS) spectrum) may be used by a mobile terminal 203 located in the first geographical region.

Further, it is assumed that in a second geographical region 202 (in this example shaped as an elliptical-shaped ring around the first geographical region 201) a white space sub-spectrum S2 of the overall white space spectrum may be used by a mobile communication terminal 204 located in the second geographical region.

For example, outside the first geographical region 201 and the second geographical region 202, the mobile terminal may not use any parts of the white space spectrum.

According to one aspect of this disclosure, a joint usage of white space resources (e.g. TV white space resources) among commercial, public protection and military technologies is made possible. For example, sudden requirements for civil security and/or military systems can be enforced and these systems may coexist with commercial systems. Specifically, according to one aspect of this disclosure a short-term priority change among the various (secondary) systems is introduced in case that public protection and/or military systems suddenly/unexpectedly require priority access to a white space spectrum at a given location and at a given time.

The management of various distinct systems accessing (TV) white spaces and inherent coexistence mechanisms are defined in the IEEE 802.19/IEEE 802.19.1 Standard. However, this standard is limited to IEEE (commercial) systems and is neither covering civil security nor military systems. Also, data-base systems and access mechanisms as for example defined in IETF PAWS (Internet Engineering Taskforce Protocol to Access White Space database) are not covering the requirements of non-commercial systems.

It should further be noted that a "kill switch" (i.e. a command to a commercial communication system to stop all whites space usage) is typically an overkill and leads to a poor QoS for commercial systems.

Additionally, it should be noted that a sudden priority change (i.e. a short-term change of the usage rights) for white space usage may be seen to somehow contradict the basic (TV) white space access principles building on a data-base: typically, intended usage by primary systems is indicated well in advance (typically, 24 to 48 hours before usage).

According to various aspects of this disclosure, mechanisms for short-term usage right changes of (TV) white spaces for commercial, civil security and military applications are provided and/or various levels of priority increase with respect to white space spectrum usage for commercial, civil security and military applications are provided.

Figure 3:
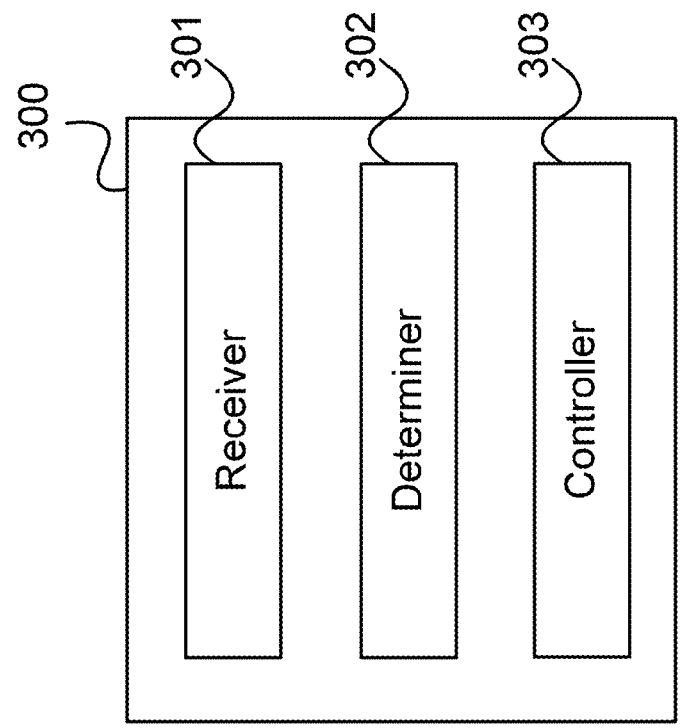
FIG. 3 shows a communication network device.

Generally, according to one aspect of this disclosure, a device of a communication network is provided as illustrated in FIG. 3.

FIG. 3 shows a communication network device 300.

The communication network device 300 includes a receiver 301 configured to receive a request that communication resources, that have been free for allocation by a communication network should not be allocated by the communication network and a determiner 302 configured to determine a set of communication devices for which the communication resources have been free for allocation and which should not allocate the communication resources.

The communication network device 300 further includes a controller 303 configured to cause that the communication resources are not allocated by the communication devices of the determined set.

According to one aspect of this disclosure, in other words, a network component is provided that determines, upon a request that certain communication resources, e.g. one or more radio frequencies, should not be used, which is for example received from a component of a privileged communication system, the communication devices (e.g. communication terminals and/or base stations) that are concerned by the request or, in other words, to which the request applies. The network component (the controller 303) ensures that the determined communication devices do not use the communication resources. The request may for example relate to a certain time period and/or a certain geographic region. Thus, the concerned communication devices which are determined may be communication devices that are located in the geographic region.

The request may for example be received by the communiation network device from a (central) controlling entity which has decided to re-purpose the concerned communication resources, e.g. spectrum that was made accessible to a civil cellular communication network (i.e. which has been free for allocation by the civil cellular communication network) is re-purposed such that only PPDR (Public Protection and Disaster Relief) systems can access it. This re-purposing can be time-limited, i.e. the time for re-opening of the spectrum for the (e.g. civil) cellular communication network can be fixed well in advance, possibly at the time when the concerned devices are forced to use other communication resources.

The request may thus indicate that the communication network may no longer have an access right to the communication resources. However, one or more other communication networks (e.g. PPDR communication systems or military systems) may still have the access right.

For example as a controlling entity described above, according to one aspect of disclosure, a communication network device is provided comprising a detector configured to detect whether white space communication resources, that have been free for allocation by a first communication network are needed by a second communication network; a transmitter configured to transmit a request to the first communication network that the communication resources should not be allocated by the first communication network. A corresponding method for allocating communication resources may also be provided.

It should be noted that allocation by a communication device may be understood as an allocation for the communication device. This means that the communication device does not necessarily actively allocate the communication resources but the communication resources may be allocated for the communication devices such that they are used for a communication in which the communication device participates (and are in this sense allocated by the communication device). For example, the communication device may be a communication terminal and a base station allocates the communication resources for a communication connection between the base station and the communication terminal such that in this sense the communication resources are allocated by (or, in other words occupied by) the communication terminal.

The communication resources are for example frequency resources of a white space spectrum. For example, the white space spectrum includes TW white spaces and/or the 2.3-2.4 GHz band.

It should be noted that the communication resources for example are a frequency band corresponding to a frequency channel. The communication resources may also correspond to a broader frequency band corresponding to a plurality of frequency channels.

The controller is for example configured to cause that the communication resources are not allocated by the communication devices of the determined set by triggering, for each communication device of the set of communication devices, the sending of a message indicating that the communication resources should not be allocated by the communication device. This message may for example indicate that a re-purposing of the communication resources has been performed (e.g. instead of informing the communication devices that a usage is no longer possible).

For example, the message indicates that the communication device should move to other communication resources (i.e. should allocate the other communication resources instead of the communication resources that are not to be used).

It should be noted that this indicating to move to other communication resources may differ from a handover mechanism where the handover is triggered by a controller instructing a communication terminal to move to one or more different frequency bands. According to one aspect of this disclosure, one of the following is for example carried out: i) the communication device is informed beforehand about a priority change/repurposing of frequency bands and the communication device has some pre-determined time in order to trigger a handover. For example, there is no automized mechanism (e.g. triggering the handover) from the network side. ii) Alternatively, the network side may indeed decide about new communication resources to be used by the concerned communication terminals. In this case, a difference to a "normal" handover of one or more communication terminals may be seen in the fact that one/several concerned terminals are not simply forced to perform a handover but a mass-handover of the concerened communication terminals is performed for accommodating the constraints originating from the repurposing of communication resources. In this context, communication resources are split among the concerned communication terminals and handovers are performed correspondingly and in a way such that simultaneous handovers are performed for all concerned communication terminals.

According to one aspect of this disclosure, the communication resources are frequency resources of a white space spectrum and the message indicates that the communication device should move to communication resources licensed to the communication network.

The communication devices for example include at least one of a base station and a communication terminal.

According to one aspect of this disclosure, the communication resources should not be allocated in a certain geographical region and the determiner is configured to determine the set of communication terminals based on a geographical location of the communication devices.

For example, the determiner is configured to determine the set of communication devices such that it includes all communication devices of the communication network located in the geographical region.

The communication network is for example a cellular communication network and the determiner is for example configured to determine a set of radio cells of the cellular communication network such that set of communication devices are all communication terminals of the communication network located in a radio cell of the set of radio cells.

For example, the controller is configured to cause that the communication resources are not allocated by the communication devices of the determined set of communication devices by sending a message to each base station of the set of base stations indicating that the communication resources should not be allocated by any communication terminal of the communication network located in the radio cell operated by the base station. The base stations may then accordingly inform the communication terminals that the communication resources are not to be used and/or may for example perform a re-scheduling for the communication terminals such that the communication resources which are not to be used are not used.

It should be noted that the aspects of this disclosure may not only be applied to commercial cellular base stations, but also to base stations of other communication systems, such as PPDR systems (which can have a cellular structure, too), military communication systems, other civil communication systems, etc. It should be noted that aspects of this disclosure may also be applied to fully distributed systems, i.e. communication systems in which no base stations or similar central control points exist.

The receiver is for example configured to receive the request from a privileged communication system which may access the communication resources with priority and the request may indicate that the privileged communication network requests a priority access to the communication resources.

The receiver may further be configured to receive an indication that the priority access has ended and the controller may further be configured to inform the communication devices that the communication resources are again free for allocation by the communication devices.

Figure 4:
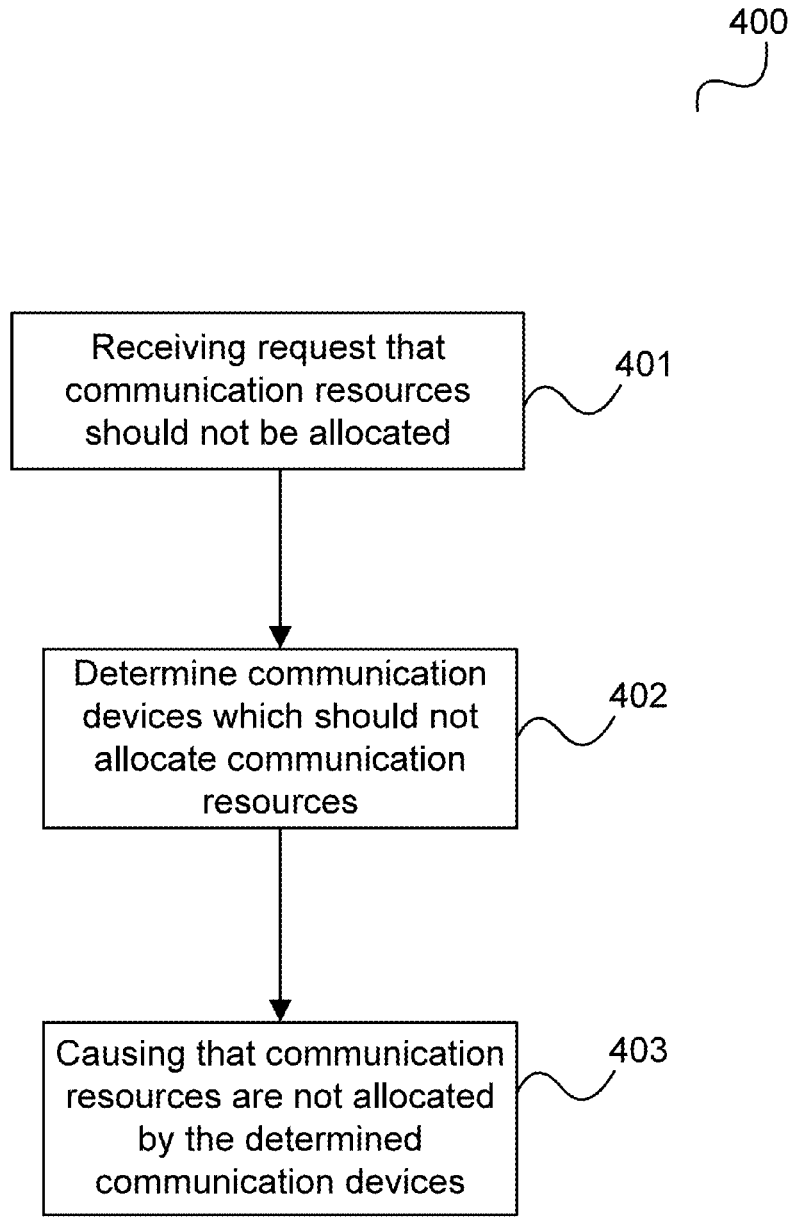
FIG. 4 shows a flow diagram illustrating a method for managing communication resource allocation.

The communication network device 300 for example carries out a method as illustrated in FIG. 4.

FIG. 4 shows a flow diagram 400.

The flow diagram 400 illustrates a method for managing communication resource allocation.

In 401, a request that communication resources that have been free for allocation should by a communication network not be allocated by the communication network is received.

In 402, a set of communication devices for which the communication resources have been free for allocation and which should not allocate the communication resources.

In 403 it is caused that the communication resources are not allocated by the communication devices of the determined set.

Figure 5:
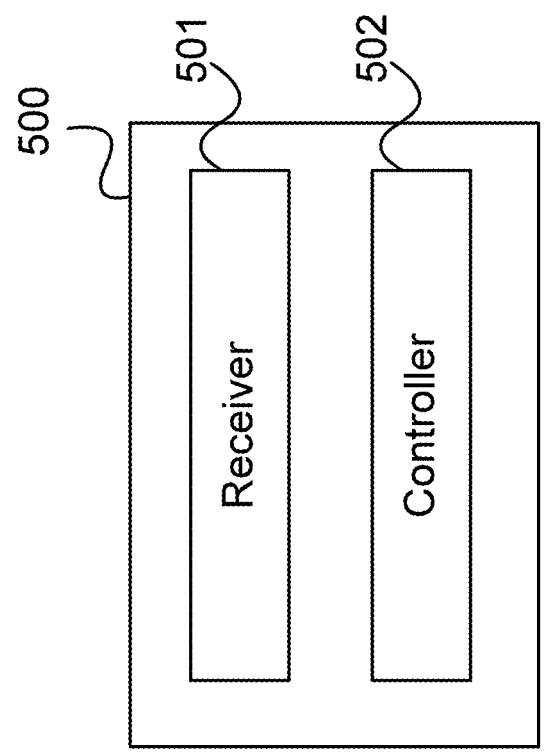
FIG. 5 shows a communication terminal.

The communication network device 300 for example communicates with a communication device as illustrated in FIG. 5.

FIG. 5 shows a communication device 500.

The communication device 500 for example corresponds to a communication device of the determined set of communication devices.

The communication device 500 includes a receiver 501 configured to receive a first message indicating that communication resources are free for allocation by the communication device during a time period and a controller 502 configured to allocate the communication resources for the time period.

The receiver 501 is configured to receive a second message indicating that the communication resources should not be allocated by the communication device and the controller 502 is configured to de-allocate the communication resources for the time period.

According to one aspect of this disclosure, in other words, a communication device allocates a communication resource after having received a first message with an indication that it may allocate the communication resource, e.g. that the communication resource is available and, after receiving a second message indicating that the communication resource may not be used by the communication device (in contrast to what was indicated by the earlier first message) de-allocates the communication resource such that it is not used. For example, in response to the reception of the first message, the communication device schedules usage of the communication resource, e.g. for an ongoing communication connection or a communication connection to be established, and, in response to the reception of the second message, redoes the schedule and for example schedules usage of a different communication resource for the communication connection.

The controller is for example configured to allocate the communication resources for the time period in response to the first message and is for example configured to de-allocate the communication resources for the time period in response to the second message.

The communication resources are for example frequency resources of a white space spectrum.

The communication device is for example a communication terminal or a base station.

For example, the communication device is a communication terminal of a cellular communication network.

The controller is for example configured to allocate other communication resources to replace the de-allocated communication resources. For example, the communication device moves to another frequency band for a communication connection.

The communication device is for example a communication device of a communication network (e.g. a communication terminal or a base station) and the other communication resources are communication resources licensed to the communication network. In other words, for example, the communication device moves from white spaces to a spectrum that is licensed for it to be used.

Figure 6:
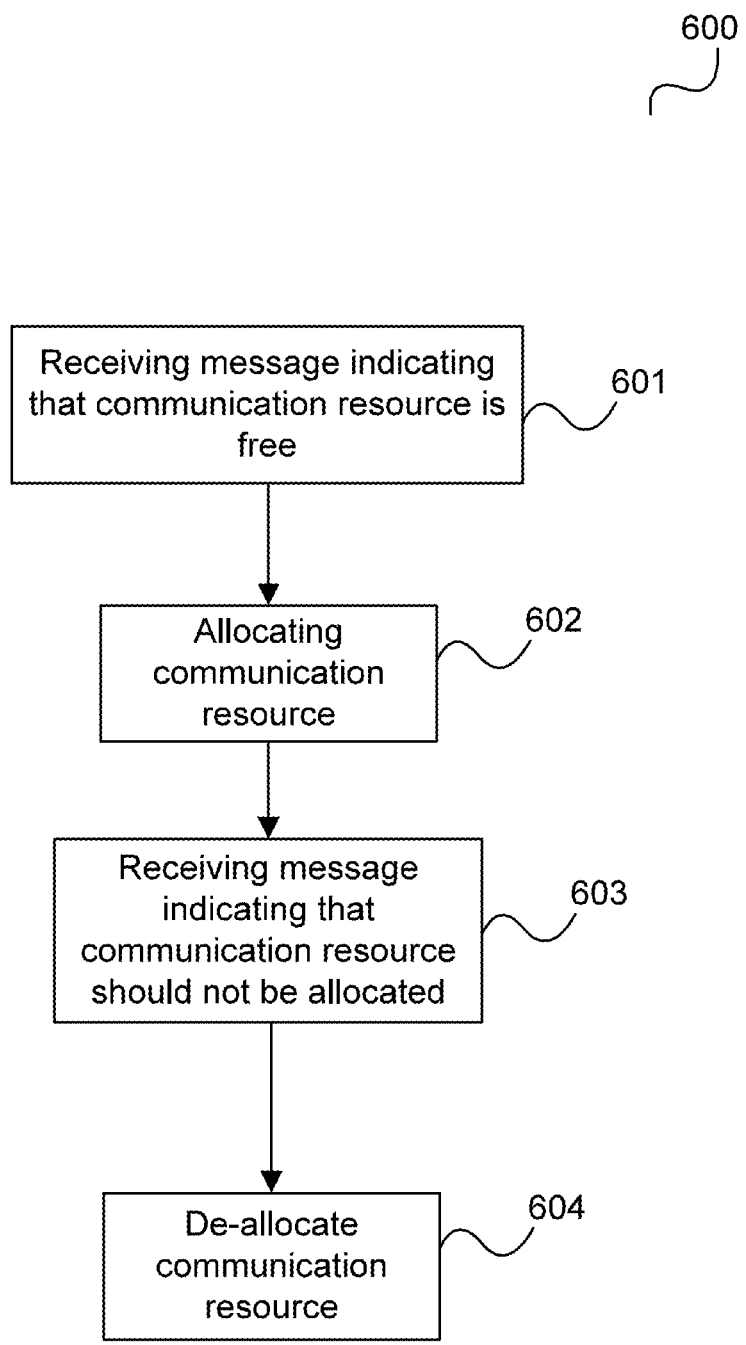
FIG. 6 shows a flow diagram illustrating a method for communication resource allocation.

The communication terminal 500 for example carries out a method as illustrated in FIG. 6.

FIG. 6 shows a flow diagram 600.

The flow diagram 600 illustrates a method for communication resource allocation.

In 601, a first message is received indicating that communication resources are free for allocation by the communication device during a time period.

In 602, the communication resource is allocated for the time period.

In 603, a second message is received indicating that the communication resources should not be allocated by the communication device.

In 604, the communication resource is de-allocated for the time period.

It should be noted that aspects described in context of one of the communication network devices are analogously valid for the communication terminal 500, the other communication network devices herein and the methods illustrated in FIGS. 4 and 6 and vice versa.

It should further be noted that the various components of the communication network device 300 and the communication terminals 500 (e.g. determiner, receiver, transmitter) may for example be implemented by one or more circuits of the communication network device 300 and the communication terminals 500. A "circuit" may be understood as any kind of a logic implementing entity, which may be special purpose circuitry or a processor executing software stored in a memory, firmware, or any combination thereof Thus, a "circuit" may be a hard-wired logic circuit or a programmable logic circuit such as a programmable processor, e.g. a microprocessor (e.g. a Complex Instruction Set Computer (CISC)

processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative aspect of this disclosure.

Figure 7:
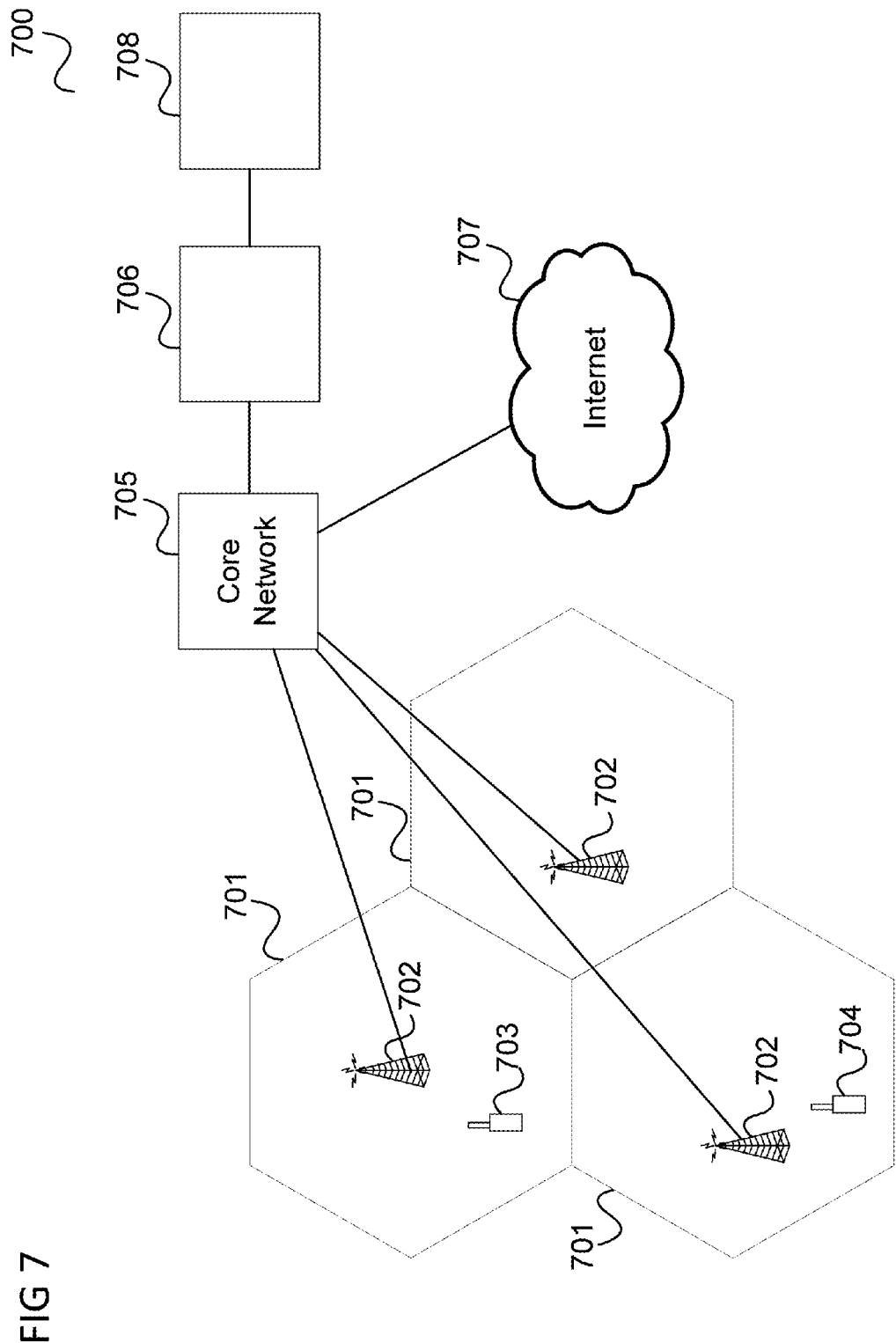
FIG. 7 shows a communication arrangement.

In the following, aspects of this disclosure are described with more detail with reference to the exemplary communication arrangement as illustrated in FIG. 7.

FIG. 7 shows a communication arrangement 700.

The communication arrangement 700 includes radio cells 701 wherein each radio cell 701 is operated by a respective base station 702. The base stations 702 for example correspond to the base stations 103 shown in FIG. 1, i.e. are base stations according to LTE, or are base stations according to any other wireless communication standard including, for example, a M2M (Machine-to-Machine) communication system standard. A communication terminal 703, 704 located in one of the radio cells 701 may communicate with the base station 702 operating the radio cell 701 (over the so-called air interface) and be provided with a communication connection to a core network 705 to other communication devices and other communication networks, e.g. the Internet 707.

For the communication between the communication terminals 703, 704 and the base stations 702 white spaces may be used. In other words, the communication network including the communication terminals 703, 704 the base stations 702 (and the core network 705) may act as a secondary system for white spaces.

The communication system 700 further includes a communication network device (in other words a network side component) 706 which may be part of the communication network, e.g. of the core network 705, and which implements a database and/or a coexistence management server (e.g. a coexistence management server according to IEEE 802.19/IEEE 802.19.1 for IEEE systems).

Additionally, the communication system 700 includes a requesting entity 708 which may request usage of the white space resources with priority, e.g. a civil security or military communication system. Generally, the requesting entity 708 may be a component of any communication system that may have prioritized access to the white spaces and can thus be seen as privileged communication system. In contrast, the communication network including the base stations 702 together with the communication terminals 703, 704 is in this example a communication system that has to stand back in case of a prioritized access of the privileged communication system. The communication network including the base stations 702 is for example a commercial communication network that has to stand back in case of a prioritized access of the, for example, a privileged communication system that is run by the government or the state. In a normal situation, the privileged communication system may not be prioritized over other (e.g. commercial) communication systems but it may be prioritized upon a certain event, e.g. an emergency. The prioritization in such a case is in the following referred to a priority change (in favor of the privileged communication system).

It should be noted while in the example described in the following, resources of the communication terminals 703, 704 are de-allocated in case of a prioritized access of the privileged communication system, similarly, resources may be de-allocated from the base stations (which in turn leads to a de-allocation of communication resources from the communication terminals 703, 704 served by the base stations).

An exemplary message flow is described in the following with reference to FIG. 8.

Figure 8:
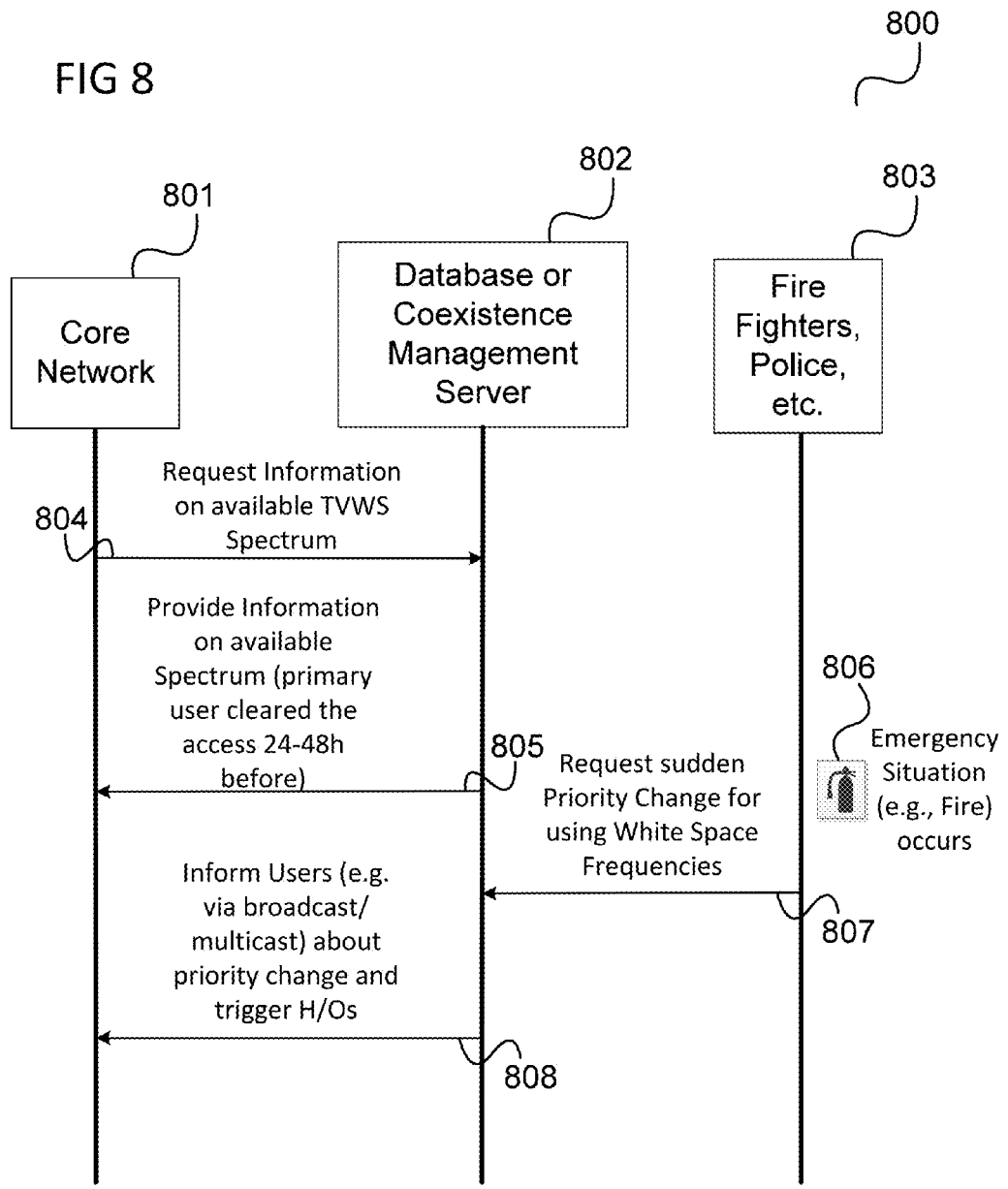
FIG. 8 shows a message flow diagram.

FIG. 8 shows a message flow diagram 800.

The message flow takes place between a communication terminal 801, e.g. corresponding to one of the communication terminals 103, 104, a communication network device 802, e.g. corresponding to the communication network device 706, and a requesting entity 803, e.g. corresponding to requesting entity 708.

In 804, the communication terminal 801 obtains information about the availability of a white space spectrum (e.g. a TV white space spectrum) by sending a corresponding request message to the communication network entity 802 which in response provides information on the available white space spectrum to the communication terminal 802 in 805 ("pull-mode"). It should be noted that the communication between the communication terminal 801 and the communication network device 802 may be performed via the base station 702 operating the radio cell 701 in which the communication terminal 801 is located. For example, the primary user (i.e. the primary system) has indicated 24 h or 48 h earlier than the white spaces are not going to be used by the primary system.

The communication terminal 801 may accordingly plan to use the white spaces allocate them, e.g. for one or more communication connections and/or start using the white space communication resources.

It is assumed that in 806, an emergency situation (e.g. a fire) occurs. The requester 803 (e.g. a civil security, such as a Blue-Light or Red-Light service, and/or military system) requires a sudden change in access priority to the white space communication resources (e.g. to a part of the (TV) white space spectrum or priority to all of it). Therefore, the requester 803 in 807 sends a priority change request message to the communication network device 803.

In 808, the network communication device 802 determines all communication terminals that are concerned by the priority change. For example, the network communication device 802 determines the geographic region for which the white space communication resources are needed (e.g. corresponding to a geographical region for which the emergency situation is relevant, e.g. a geographical region in which the white space communication resources are needed for communication related to the emergency) and determines all communication terminals 703, 704 which are located in radio cells 701 in this geographical region (or overlapping with this geographical region) as concerned communication terminals 703, 704. The communication network device 802 then informs the determined communication terminals 703, 704, in this example the communication terminal 801, about the priority change using a corresponding information message ("push mode").

It should be noted that although other communication terminals may be concerned by the priority change (in terms that they are not allowed to use the white space resources any more), the communication network device 802 informs only those communication terminals which are registered with a communication network for which the communication network device 802 is responsible, e.g. the communication network including the base stations serving the wireless communication terminal 801 which is for example a commercial communication network. Thus, "concerned" communication terminals may refer to communication terminal which are concerned and which are known to the communication network device 802, e.g. registered with a communication network for which the communication network device 802 is responsible.

Informing the communication terminal 801 about the required priority changes may for example be handled in one of the following ways.

Firstly, the communication network device 802 may determine a new spectrum allocation for all concerned (commercial) communication terminals. For this, the communication network device 802 may keep track of all communication terminals that request information about available white space resources and stores in a database the final decision on how to use the available white space resources (e.g. in alignment with indications from a coexistence management server that may be part of the communication network device 802 but may also be a separate entity).

The communication network device 802 determines new spectrum allocations for all communication terminals and transmits information about the new spectrum allocation to each communication terminal, e.g. via point-to-point communication. For example, this is done by a message as illustrated in FIG. 9.

Figure 9:
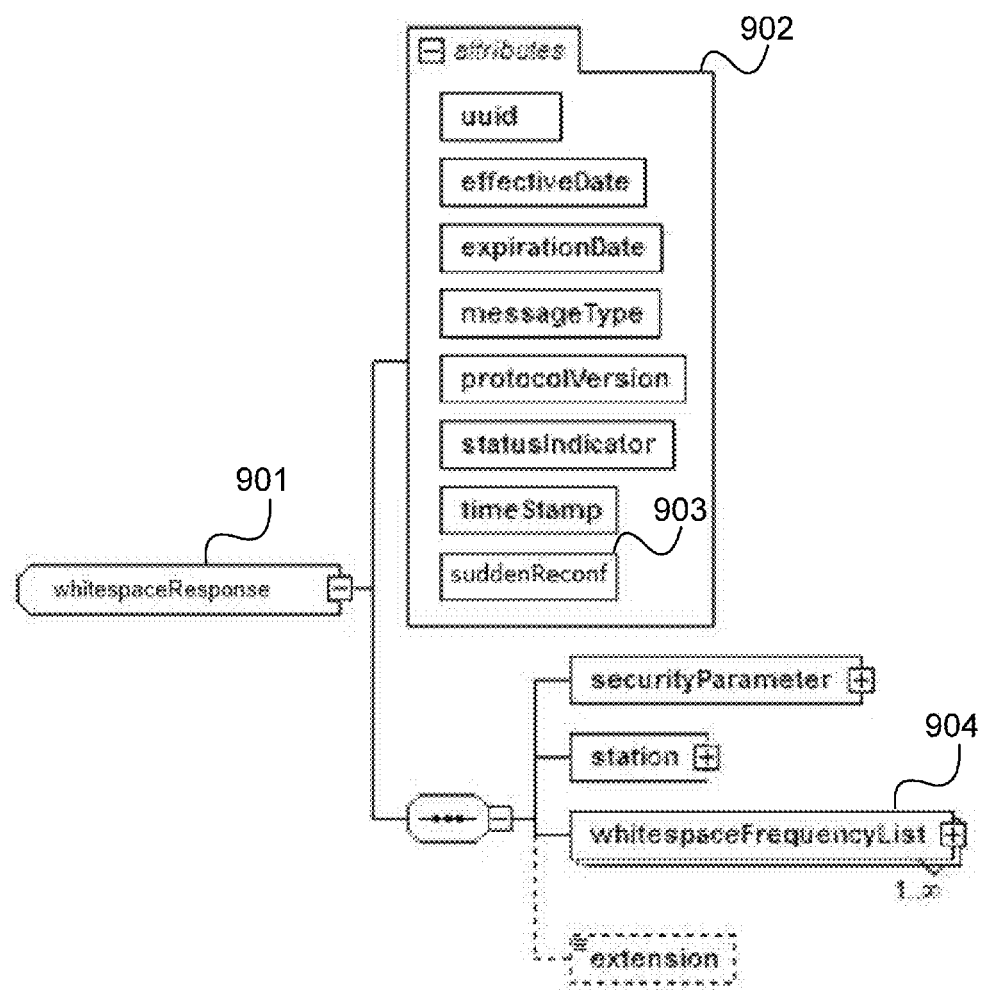
FIG. 9 shows a data model to illustrate an information message.

FIG. 9 shows a data model to illustrate an information message 901.

In this example, the information message 901 is based on the information message as defined by IETF PAWS.

The information message, which is a whitespaceResponse message in this example, includes a plurality of attributes 902 (i.e. attribute information) including a flag 903 indicating that a priority change has occurred and that thus, a reconfiguration in terms of the communication resources to be used needs to be performed.

The information message 901 further includes a whitespace frequency list 904 indicating to the receiver (in this example the communication terminal 801) the whitespace frequencies available after the priority change. Upon reception of the information message 901, the communication terminal 801 only allocates and uses the whitespace frequencies as indicated by the whitespace frequency list 904.

It should be noted that the information message as illustrated in FIG. 9 can be seen to correspond to an extension of the IETF PAWS Data model by including the flag 903 that indicates to the receiver of the message (i.e. a concerned communication terminal, in this example the communication terminal 801) that a (sudden) priority change has occurred. The information message 901 without the flag 903 may for example be used in 805 for indicating the available white space resources before the priority change by a corresponding indication of the available whitespace frequencies in the whitespace frequency list 904.

It should further be noted that when the priority change disappears, e.g. when the emergency situation is over and the requester 803 no longer has need for the white space resources, the information message 901 as illustrated in FIG. 9 can be used by the communication network device 802 to indicate to the communication terminal 801 that the priority change is over by a corresponding setting of the flag 903. For example, a value of 1 of the flag 903 indicates that there is a priority change and a value of 0 of the flag 903 indicates that there is no priority change (e.g. any more). For example, the communication terminal 801 may return to using the communication resources as signaled to be available in 805.

As a second way to inform the communication terminal 801 about a priority change, the communication network device 802 may only inform the communication terminal about the priority change, e.g. by transmitting an information message as illustrated in FIG. 9 which only includes the flag 903, i.e. in which one or more or all of the other attributes 902 are left out and in which also other information may be left out. Specifically, more effort is imposed on the communication terminal 801 since the indication of the white space frequencies 904 available after the priority change is not included. The information message may in this example be transmitted via multicast or broadcast to the concerned communication terminals.

Following the reception of the flag 902 (with a value indicating that a priority change occurred) the communication terminal 801 stops accessing the white space spectrum and, as in 804, sends a request to the communication network device 802 for information about the (now) available whitespace communication resources. It should be noted that the IETF PAWS information model may be used for such a request.

As a result of the signaling of a priority change as explained with reference to FIG. 8 to all (known) concerned communication terminals, e.g. all communication terminals of the communication network including the base stations 702 in a certain geographic region, it can be expected that suddenly and abruptly a large portion of the spectrum is available to the prioritized users, in this example the requester 803. Since the requester 803 may include a high number of users (e.g. a lot of firemen or policemen may be equipped with a communication terminal) the situation occurs that a portion of the spectrum suddenly becomes available for a high number of communication terminals. (A similar situation occurs when the priority change is over and a large white space spectrum is suddenly available for a large number of "normal" or "commercial" secondary users).

In such a situation, a large number of communication terminals may then detect the availability of communication resources and they may flood the system with massive access requests. This issue may be for example addressed in one of the following way:

i) Usage of a backlog-mechanism (indicating waiting periods, etc.) to avoid that the system is suddenly flooded, similar to mechanisms in WiFi. A user may derive a randomly chosen waiting time based on a pre-defined pseudo-random-value-generator.

ii) A backlog-related message may be included in a message (e.g. a broadcast message) indicating availability of the spectrum in order to direct the access of novel users. For example, the communication terminals of the communication system having priority may be informed with a broadcast message about the availability of the spectrum including access rules, e.g. scheduling information, to avoid a simultaneous access of all the communication terminals. Similarly, a message sent to the commercial communication terminals that the priority change is over may have such access rules to avoid a sudden access of a high number of communication terminals at the same time.

According to one aspect of this disclosure, various levels of priority increase with respect to white space spectrum usage (e.g. for Commercial, Civil Security and Military applications) are introduced. For example, depending on the sudden white space spectrum requirements of a high-priority communication system (e.g. a civil security and/or military system), various ways of freeing (or liberating) the white space spectrum used by commercial communication terminals can be used. For example, the following approaches can be used which are denoted as a "low" priority of a civil security and/or military system over commercial systems, a "medium" priority of civil security and/or military system over a commercial systems and a "high" priority of a civil security and/or military system over commercial systems in case of a priority white space spectrum access by the civil security and/or military system (e.g. in case of an emergency). These approaches are described in the following.

Small increase of priority of civil security and/or military systems: In case of a low priority increase of civil security and/or military systems over commercial systems the operation of commercial communication terminals accessing white spaces is not severely impacted in case of prioritized access of civil security and/or military systems, e.g. in case of an emergency situation. For example, in such a case, the time-slot available for the commercial communication terminals are reduced, e.g. via a coexistence management entity according to IEEE 802.19/IEEE 802.19.1 for commercial systems. This liberates communication resources that can be used by the civil security and/or military system. This approach is illustrated in FIG. 10.

Figure 10:
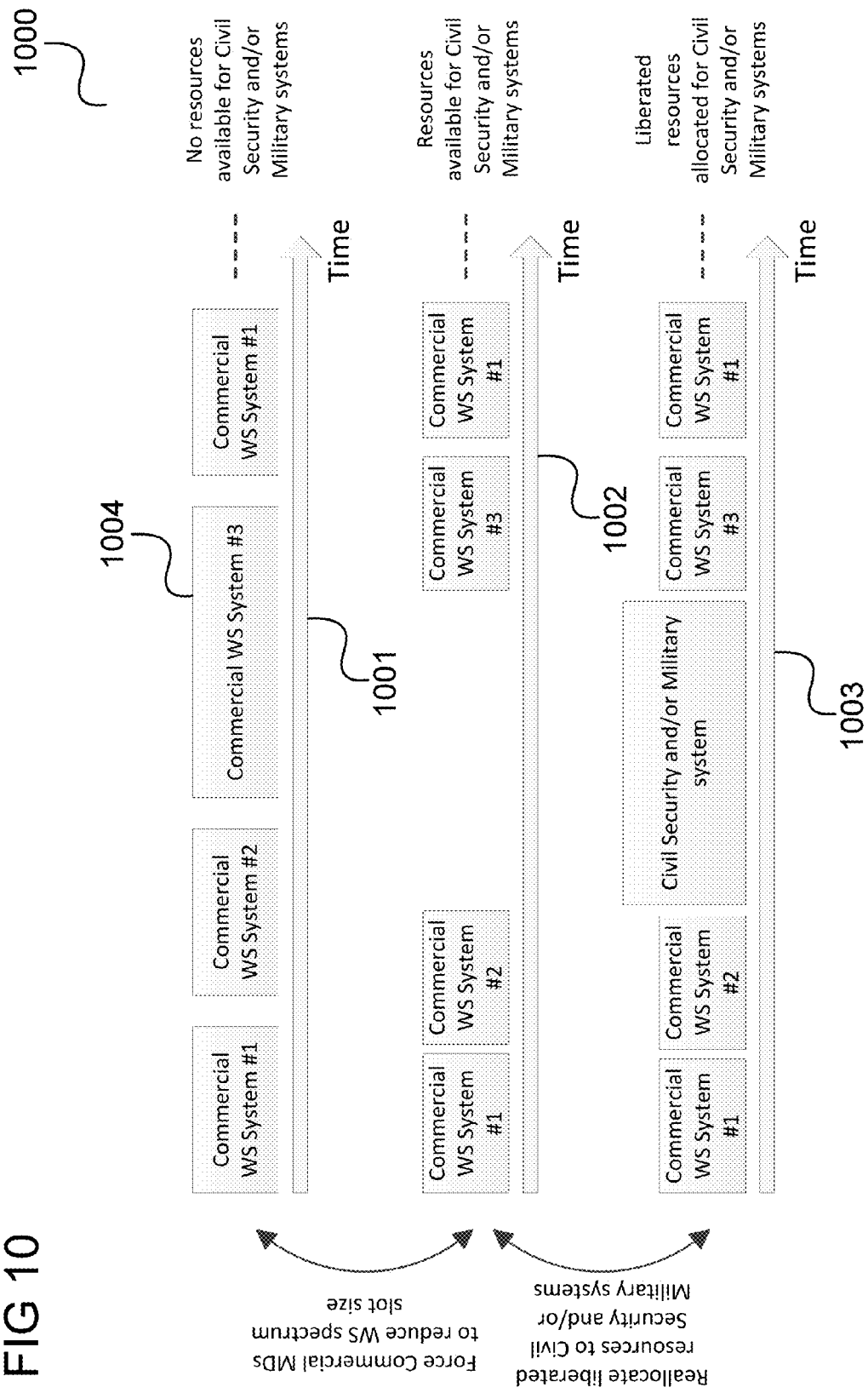
FIG. 10 shows a resource allocation diagram illustrating the freeing of time slots to a civil security and/or military system.

FIG. 10 shows a resource allocation diagram 1000 illustrating the freeing of time slots to a civil security and/or military system.

The resource allocation diagram 1000 shows the resource allocation along a first time axis 1001 when the spectrum is fully occupied by commercial systems (numbered from 1 to 3), along a second time axis 1002 when the spectrum has been freed for a certain time period and along a third time axis 1003 when the spectrum is used during this time period by a civil security and/or military system.

In this example, time slots 1004 allocated for the third communication system are de-allocated by the third communication system in case of a priority change (i.e. in case of a prioritized access to the white space, e.g. in case of an emergency) and are then re-allocated by the civil security and/or military system.

Medium increase of priority increase of civil security and/or military systems: In case of a medium priority increase of civil security and/or military systems over commercial systems one or several entire white space channels are liberated for a civil security and/or military system. Commercial communication terminals currently using the channels to be freed are transferred to other white space channels and/or licensed spectrum (i.e. frequency resources licensed to the communication network to which they belong). In case that the other white space channels to which the communication terminals should be transferred are already occupied by commercial users, the corresponding periods for which the communication resources are occupied may for example be shortened such that the transferred communication terminals can also have access to a share of the spectral resources. This approach is illustrated in FIG. 11.

Figure 11:
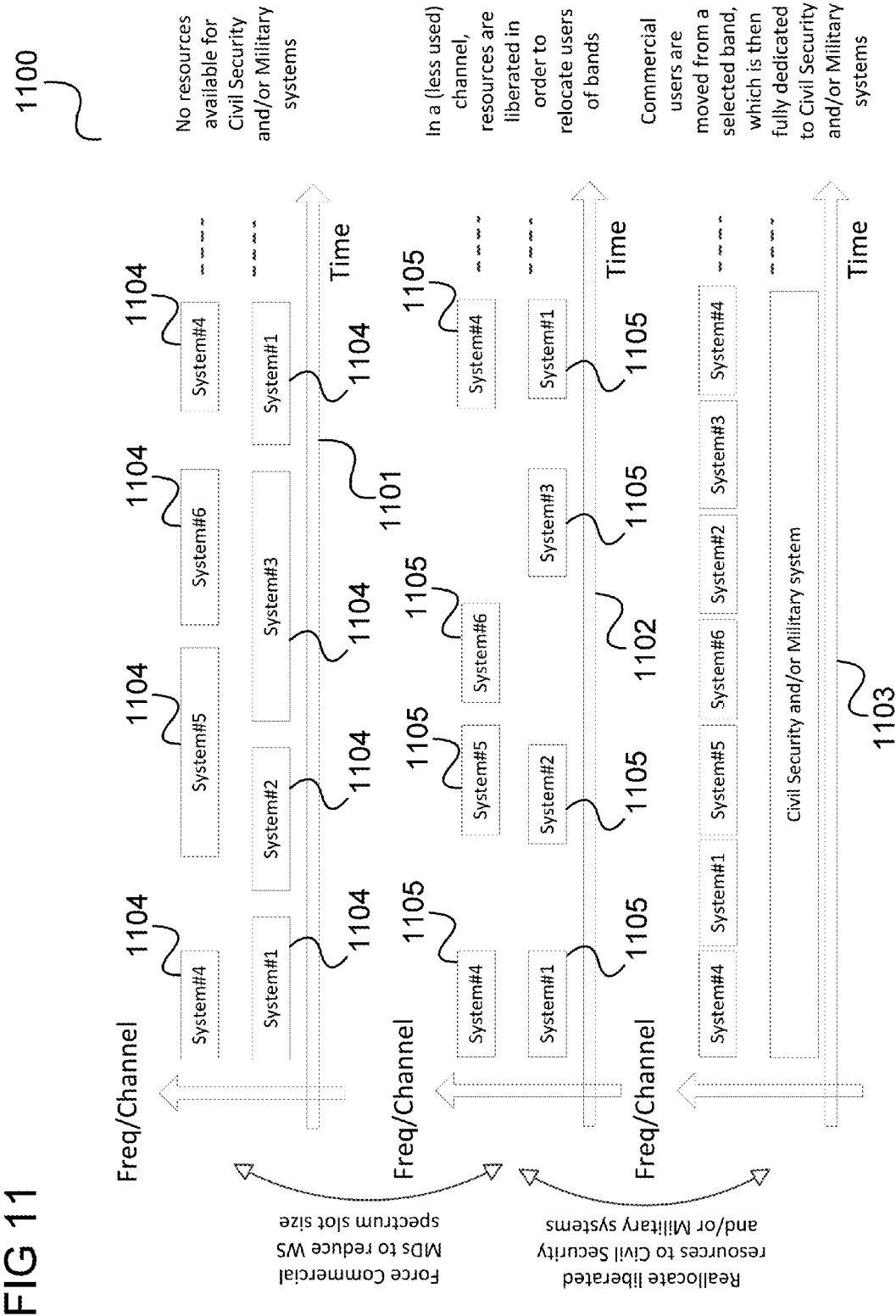
FIG. 11 shows a resource allocation diagram illustrating the freeing of time slots to a civil security and/or military system.

FIG. 11 shows a resource allocation diagram 1100 illustrating the freeing of time slots to a civil security and/or military system.

The resource allocation diagram 1100 shows the resource allocation along a first time axis 1101 when the spectrum is densely occupied by commercial systems (numbered from 1 to 6), along a second time axis 1102 when the spectrum has been freed for certain time periods and certain frequency channels and along a third time axis 1103 when all commercial communication terminals are allocated resources of a first frequency channel and a second frequency channel is allocated to a civil security and/or military system.

In this example, time periods 1104 for which white space spectrum is allocated to the commercial communication terminals are shortened to shortened time periods 1105 and, if white space resources of the second channel are allocated to the commercial communication terminals this resources are de-allocated and resources of the first channel are re-allocated to the commercial communication terminals such that the whole second communication channel is freed up for the civil security and/or military system.

Strong increase of priority increase of civil security and/or military systems: In case of a high priority increase of civil security and/or military systems over commercial systems all white space channel, i.e. the whole white space spectrum are liberated for the civil security and/or military system in case of a priority access of the civil security and/or military system. Commercial users using the white space spectrum when the priority change occurs may be transferred to licensed spectrum. In case that no licensed spectrum can be identified, the commercial communication terminals are forced to stop communication.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication network device comprising:
receiver circuitry to receive, from a civil security and/or military communication system associated with a first priority, a request to restrict allocation of television white space (TVWS) communication resources that have been free for allocation by a communication network within a geographical region;
a determiner to determine a set of communication devices for which the TVWS communication resources have been free for allocation, wherein the set of communication devices is associated with a second priority, which is less than the first priority;
a controller to restrict allocation of the TVWS communication resources for the communication devices of the determined set.

2. The communication network device of claim 1, wherein the controller is to restrict allocation of the TVWS communication resources for the communication devices by a transmission of one or more messages to one or more base stations that provide one or more cells within which the communication devices are operate.

3. The communication network device of claim 1, wherein the one or more messages indicate that a first communication device of the set of communication devices should move to other communication resources.

4. The communication network device of claim 1, wherein the one or more messages indicate that a first communication device of the set of communication devices should move to communication resources licensed to the communication network.

5. The communication network device of claim 1, wherein the communication devices comprise at least one of a base station and a communication terminal.

6. The communication network device of claim 1, wherein the determiner is to determine the set of communication terminals based on a geographical location of the communication devices.

7. The communication network device of claim 6, wherein the determiner is to determine the set of communication devices such that it includes all communication devices of the communication network located in the geographical region.

8. The communication network device of claim 1, wherein the communication network is a cellular communication network and the determiner is to determine a set of radio cells of the cellular communication network such that set of communication devices are all communication terminals of the communication network located in a radio cell of the set of radio cells.

9. The communication network device of claim 8, wherein the controller is to send a message to each base station of the set of base stations indicating the restriction of allocation of the TVWS communication resources within the radio cells operated by the individual base stations.

10. The communication network device of claim 1, wherein the request indicates that the civil security and/or military communication system requests a priority access to the TVWS communication resources.

11. The communication network device of claim 1, wherein the receiver circuitry is to receive an indication that priority access has ended and the controller is to inform the communication devices that the TVWS communication resources are again free for allocation for the communication devices.

12. The communication network device of claim 1, wherein the controller is to restrict allocation of the TVWS communication resources for the communication devices by reducing a number of slots available to the communication devices in the TVWS communication resources.

13. The communication network device of claim 1, wherein the controller is to restrict allocation of the TVWS communication resources for the communication devices by reducing a number of channels available to the communication devices in the TVWS communication resources.

14. The communication network device of claim 1, wherein the controller is to restrict allocation of the TVWS communication resources for the communication devices by reducing a number of slots and channels available to the communication devices in the TVWS communication resources.

15. A method for managing communication resource allocation comprising:
    receiving, from a civil security and/or military communication system associated with a first priority, a request to restrict allocation of television white space (TVWS) communication resources that have been free for allocation by a communication network within a geographical region;
    determining a set of communication devices for which the TVWS communication resources have been free for allocation, wherein the set of communication devices is associated with a second priority, which is less than the first priority; and
    restricting allocation of the TVWS communication resources for the communication devices of the determined set.

16. One or more non-transitory computer-readable media having instructions that, when executed, cause a device to:
    process a request, received from a civil security and/or military communication system associated with a first priority, to restrict allocation of television white space (TVWS) communication resources that have been free for allocation by a communication network within a geographical region;
    determine a set of communication devices for which the TVWS communication resources have been free for allocation, wherein the set of communication devices is associated with a second priority, which is less than the first priority; and
    restrict allocation of the TVWS communication resources for the communication devices of the determined set.

17. The one or more non-transitory computer-readable media of claim 16, wherein the instructions, when executed, further cause the device to: transmit one or more messages to one or more base stations that provide one or more cells within which the communication devices are to operate to restrict allocation of the TVWS communication resources.

18. The one or more non-transitory computer-readable media of claim 16, wherein the instructions, when executed, further cause the device to: reduce a number of slots available to the communication devices in the TVWS communication resources to restrict allocation of the TVWS communication resources for the communication devices.

19. The one or more non-transitory computer-readable media of claim 16, wherein the instructions, when executed, further cause the device to: reduce a number of channels available to the communication devices in the TVWS communication resources to restrict allocation of the TVWS communication resources for the communication devices.

20. The one or more non-transitory computer-readable media of claim 16, wherein the instructions, when executed, further cause the device to: reduce a number of slots and channels available to the communication devices in the TVWS communication resources to restrict allocation of the TVWS communication resources for the communication devices.

* * * * *